US012712173B2

(12) United States Patent
Ryumin et al.

(10) Patent No.: US 12,712,173 B2
(45) Date of Patent: Aug. 18, 2026

(54) SPACE CHARGE REDUCTION IN TOF-MS

(71) Applicant: DH Technologies Development Pte. Ltd., Singapore (SG)

(72) Inventors: Pavel Ryumin, Toronto (CA); Nicholas G. Bloomfield, Newmarket (CA); Igor Chernushevich, Toronto (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 373 days.

(21) Appl. No.: 18/681,206

(22) PCT Filed: Aug. 3, 2022

(86) PCT No.: PCT/IB2022/057225
§ 371 (c)(1),
(2) Date: Feb. 5, 2024

(87) PCT Pub. No.: WO2023/012702
PCT Pub. Date: Feb. 9, 2023

(65) Prior Publication Data

US 2024/0312776 A1 Sep. 19, 2024

Related U.S. Application Data

(60) Provisional application No. 63/229,607, filed on Aug. 5, 2021.

(51) Int. Cl.
*H01J 49/40* (2006.01)
*H01J 49/00* (2006.01)
*H01J 49/42* (2006.01)

(52) U.S. Cl.
CPC ...... *H01J 49/4265* (2013.01); *H01J 49/0031* (2013.01); *H01J 49/40* (2013.01); *H01J 49/4215* (2013.01)

(58) Field of Classification Search
CPC .... H01J 49/4265; H01J 49/0031; H01J 49/40; H01J 49/4215
See application file for complete search history.

(56) References Cited

U.S. PATENT DOCUMENTS 9,805,920 B2 * 10/2017 Kenny ................ H01J 49/4215
10,665,438 B2 * 5/2020 Rottmann ........... H01J 49/0045
(Continued)

OTHER PUBLICATIONS

International Search Report and Written Opinion for International Application No. PCT/IB2022/057225 dated Nov. 15, 2022.

*Primary Examiner* — Sean Luck
(74) *Attorney, Agent, or Firm* — Potomac Law Group, PLLC; Reza Mollaaghababa; Brian Hairston

(57) ABSTRACT

A mass spectrometer that includes a mass filter and a TOF mass analyzer receives the ion beam from an ion source device that ionizes a compound of a sample. The mass filter selects a precursor ion mass range and the mass analyzer mass analyzes the mass range. A continuous flow of selected precursor ions is maintained between the mass filter and the mass analyzer. A first set of parameters is applied to the mass spectrometer to produce a resolution above a first resolution threshold. A space charge effect is detected by determining if the measured TIC exceeds a TIC threshold or the measured resolution is less than the first resolution threshold. If a space charge effect is detected, at least one precursor ion transmission window with a width smaller than the mass range is applied to the ion beam by the mass filter and mass analyzed to reduce the space charge.

15 Claims, 11 Drawing Sheets

(56) References Cited

U.S. PATENT DOCUMENTS

| | | | |
|---|---|---|---|
| 2008/0149825 | A1 | 6/2008 | Kozlovski et al. |
| 2011/0057095 | A1 | 3/2011 | Loboda |
| 2018/0350580 | A1 | 12/2018 | Green et al. |
| 2019/0393023 | A1 | 12/2019 | Kozlov et al. |
| 2020/0051804 | A1 | 2/2020 | Izumi et al. |

* cited by examiner

100

SPACE CHARGE REDUCTION IN TOF-MS

RELATED APPLICATIONS

This application is a 35 U.S.C. § 371 national stage filing of International Application No. PCT/IB2022/057225, filed on Aug. 3, 2022, which claims the benefit of U.S. Provisional Patent Application Ser. No. 63/229,607, filed on Aug. 5, 2021, the content of both of which are incorporated by reference herein in their entirety.

INTRODUCTION

The teachings herein relate to detecting and reducing a space charge effect in a time-of-flight mass spectrometry (TOF-MS) system. More particularly the teachings herein relate to systems and methods for detecting a space charge effect and in response mass filtering and mass analyzing a portion of the mass range using at least one precursor ion transmission window to reduce the space charge in the time-of-flight (TOF) mass analyzer.

The systems and methods herein can be performed in conjunction with a processor, controller, or computer system, such as the computer system of FIG. 1.

TOF Space Charge Effects of Large Multiply Charged Ions

Recent time-of-flight (TOF) mass spectrometers, such as the ZenoTOF 7600 system produced by SCIEX of Framingham, MA, can measure ion peaks with greater sensitivity and resolution than previous mass spectrometers. As used herein, sensitivity refers to the measured intensity or ion current for a given mass or mass-to-charge ratio (m/z) range.

Note that the terms "mass" and "m/z" are used interchangeably herein. One of ordinary skill in the art understands that a mass can be found from an m/z by multiplying the m/z by the charge. Similarly, the m/z can be found from a mass by dividing the mass by the charge.

Resolution is the measure of the ability to distinguish between two peaks with different m/z values. As used herein, the resolution of a peak is the m/z value of the peak divided by the full width at half height maximum (FWHM) of the peak. For example, if a peak is centered at 400 m/z and the FWHM of the peak is 0.02 m/z, then the resolution is 400/0.02 or 20,000. Note that one of ordinary skill in the art understands that the terms "resolution" and "resolving power" are often used interchangeably.

Due to the higher sensitivity and resolution of these new TOF mass spectrometers space charge effects have become more important. For example, when analyzing large multiply charged ions (e.g., intact proteins), the combination of a large flux of ions into the TOF analyzer and the high charge state of individual ions results in a considerable amount of space charge that affects ion motion and reduces mass resolution. Space charge effects in addition to reduced resolution include reduced sensitivity, increased total ion current, and reduced dynamic range. Space charge refers to the interactions among nearby ions caused by Coulomb's law.

Space charge effects have previously been encountered in multi-reflecting (MR) TOF mass spectrometers. For example, Kozlov et al., space-charge effects in multi-reflecting time-of-flight mass spectrometer, Proc. 54rd ASMS Conference on Mass Spectrometry and Allied Topics (USA), 2006, (hereinafter the "Kozlov Paper") observed Coulomb repulsion effects that produced reduced mass resolution (peak widening) in an MR-TOF mass spectrometer. Models for these space charge effects in TOF mass spectrometers and electrostatic traps have also been developed. For example, Kirillov et al., simplified model of Coulomb interaction in time-of flight-mass spectrometers and electrostatic traps, 1. First order effects, widening of time-of-flight peaks, 2012, (hereinafter the "Kirillov Paper") developed a quantitative estimate of the effects of Coulomb repulsion in isochronous electrostatic systems.

An MR-TOF mass spectrometer includes two or more mirrors to increase the flight path of a TOF mass spectrometer. Because the resolution of a TOF mass spectrometer is proportional to the flight path, an MR-TOF mass spectrometer can provide an improved resolution. Such improved resolution however requires substantially longer times of analysis and therefore requires a pre-trapping device to accumulate ions before the analysis to maintain high sensitivity of analysis. The amount of ions analyzed in an MR-TOF mass spectrometer is determined by controlling the fill time to the pre-trap.

One solution to the space charge problem in trapping devices, like an MR-TOF mass spectrometer, is to limit the amount of ions being analyzed when a space charge effect is encountered. This is done by controlling the fill time to the trap.

Notably, the device described above has an axial injection scheme, which is known to suffer from low resolution compared to a preferable orthogonal injection scheme with comparable size flight paths. In case of orthogonal injection, a pre-trapping device is hard to setup, since naively coupling a trapping device to a time-of-flight mass spectrometer with orthogonal injection has significant drawbacks (https://journals.sagepub.com/doi/abs/10.1255/ejms.377). Similarly, for TOF mass spectrometers without pre-trap, like those described herein, a proposed solution to the space charge problem is to retune the TOF mass analyzer when a space charge effect is detected. Usually, this is achieved by throttling the total ion current (TIC) either by various beam focusing means or by changing adjusting focusing voltages similarly to the case of MR-TOF. In the TRIPLETOF® systems of SCIEX of Framingham, MA, for example, the attenuation of the ion beam is adjusted by changing an ion transmission control (ITC) parameter.

Unfortunately, both changes to the ion beam and changes to the duty cycle can lead to reduced sensitivity and dynamic range. Retaining sensitivity is particularly desired for large multiply charged ions because significantly more ion counts are required to produce a good spectrum for analysis of these ions than for the analysis of smaller molecules. If a poor spectrum is obtained, insufficient ion statistics can further challenge the accurate assignment of the monoisotopic peak which leads to an ambiguity in the assignment ion peaks of a few Daltons.

FIG. 2 is an exemplary series 200 of plots showing a precursor ion spectrum that includes large multiply charged ions with a high charge state and a zoomed-in section of the same spectrum showing the isotopes of one particular highly charged ion upon which embodiments of the present invention may be implemented. The spectra of FIG. 2 were produced using a TOF mass spectrometer capable of measuring intensities with high sensitivity and high resolution. Precursor ion spectrum 210 includes ions of carbonic anhydrase II, which is a protein with molecular weight on the order of 29 kDa. Peak 211 has an m/z value of 968.54. Thus, peak 211 represents a precursor ion of carbonic anhydrase II with a charge state of +30. Many of the other peaks of spectrum 210 represent other charge states of carbonic anhydrase II. For example, peak 212 represents a precursor ion with a charge state of +31, peak 213 represents a precursor ion with a charge state of +32, and so forth.

Zoomed spectrum 220 depicts the zoomed-in region around peak 211 between 968.2 and 968.8 m/z. In this region, the isotopes of the precursor at m/z value of 968.54 can be seen. For example, peak 221 represents an isotope of precursor ion of peak 211.

Unfortunately, zoomed spectrum 220 also shows the problem that is encountered when analyzing large multiply charged ions with high charge states, like those of carbonic anhydrase II. Note that the peaks of zoomed spectrum 220 look as though the base of most peaks has been cut off. As a result, the resolution of the peaks in zoomed spectrum 220 is only 30,000 (FWHM).

In contrast, the same TOF mass spectrometer used to produce zoomed spectrum 220 previously produced precursor ion peaks with a resolution of 100,000 for another large molecule, insulin, but with a lower charge state of +5. In other words, the lower resolution that was measured for the ions of carbonic anhydrase II is a space charge effect caused by the high charge state of these ions.

As described above, one known method of reducing space charge effects is to attenuate the ion beam by adjusting the ITC parameter of the mass spectrometer. Note that the ITC parameter for the spectra shown in FIG. 2 is 100%.

FIG. 3 is an exemplary series 300 of plots showing a precursor ion spectrum and a zoomed-in section of the same spectrum for the same sample protein and using the same mass spectrometer of FIG. 2 but with the ITC parameter of the mass spectrometer reduced to 3% upon which embodiments of the present invention may be implemented. Again, precursor ion spectrum 310 includes ions of carbonic anhydrase II. Peak 311 has an m/z value of 968.54. Thus, peak 311 represents a precursor ion of carbonic anhydrase II with a charge state of +30. Many of the other peaks of spectrum 310 represent other charge states of carbonic anhydrase II. For example, peak 312 represents a precursor ion with a charge state of +31, peak 313 represents a precursor ion with a charge state of +32, and so forth. Note that peak 314 is a precursor ion of another compound not a precursor ion of carbonic anhydrase II.

Zoomed spectrum 320 depicts the zoomed-in region around peak 311 between 968.2 and 968.8 m/z. In this region, the isotopes of the precursor at m/z value of 968.54 can be seen. For example, peak 321 represents an isotope of precursor ion of peak 311.

Due to the large reduction in the ITC parameter of the mass spectrometer to 3%, the peaks in zoomed spectrum 320 are much improved. Note that, in comparison to the peaks in spectrum 220 of FIG. 2, the peaks of zoomed spectrum 320 no longer look as though the base of most peaks has been cut off. In fact, the resolution of the peaks in spectrum 320 has now improved to 70,000 (FWHM). The reduction in the ITC parameter produced a reduction of the space charge of 30 times.

However, a comparison of the peaks of spectrum 210 of FIG. 2 to the peaks of spectrum 310 shows that there is a loss of sensitivity. The intensity of the peaks of spectrum 310 is now much lower than in spectrum 210 of FIG. 2. As a result, the comparison of FIGS. 2 and 3 shows that attenuating the ion beam improved the resolution but at the expense of sensitivity. Consequently, there is a need for additional systems and methods for reducing space charge effects.

In addition, methods for reducing space charge effects are only needed in special instances of particular compounds analyzed by particular instruments. Thus, space charge reduction should be coupled to the detection of space charge effects. As a result, additional systems and methods are needed for detecting and reducing space charge effects without reducing the sensitivity or resolution of a TOF mass spectrometer.

LC-MS and LC-MS/MS Background

Mass spectrometry (MS) is an analytical technique for the detection and quantitation of chemical compounds based on the analysis of mass-to-charge ratios (m/z) of ions formed from those compounds. The combination of mass spectrometry (MS) and liquid chromatography (LC) is an important analytical tool for the identification and quantitation of compounds within a mixture. Generally, in liquid chromatography, a fluid sample under analysis is passed through a column filled with a chemically-treated solid adsorbent material (typically in the form of small solid particles, e.g., silica). Due to slightly different interactions of components of the mixture with the solid adsorbent material (typically referred to as the stationary phase), the different components can have different transit (elution) times through the packed column, resulting in separation of the various components. In LC-MS, the effluent exiting the LC column can be continuously subjected to MS analysis. The data from this analysis can be processed to generate an extracted ion chromatogram (XIC), which can depict detected ion intensity (a measure of the number of detected ions of one or more particular analytes) as a function of retention time.

In MS analysis, an MS or precursor ion scan is performed at each interval of the separation for a mass range that includes the precursor ion. An MS scan includes the selection of a precursor ion or precursor ion range and mass analysis of the precursor ion or precursor ion range.

In some cases, the LC effluent can be subjected to tandem mass spectrometry (or mass spectrometry/mass spectrometry MS/MS) for the identification of product ions corresponding to the peaks in the XIC. For example, the precursor ions can be selected based on their mass/charge ratio to be subjected to subsequent stages of mass analysis. For example, the selected precursor ions can be fragmented (e.g., via collision-induced dissociation), and the fragmented ions (product ions) can be analyzed via a subsequent stage of mass spectrometry.

Tandem Mass Spectrometry or MS/MS Background

Tandem mass spectrometry or MS/MS involves ionization of one or more compounds of interest from a sample, selection of one or more precursor ions of the one or more compounds, fragmentation of the one or more precursor ions into product ions, and mass analysis of the product ions.

Tandem mass spectrometry can provide both qualitative and quantitative information. The product ion spectrum can be used to identify a molecule of interest. The intensity of one or more product ions can be used to quantitate the amount of the compound present in a sample.

A large number of different types of experimental methods or workflows can be performed using a tandem mass spectrometer. These workflows can include, but are not limited to, targeted acquisition, information dependent acquisition (IDA) or data dependent acquisition (DDA), and data independent acquisition (DIA).

In a targeted acquisition method, one or more transitions of a precursor ion to a product ion are predefined for a compound of interest. As a sample is being introduced into the tandem mass spectrometer, the one or more transitions are interrogated during each time period or cycle of a plurality of time periods or cycles. In other words, the mass spectrometer selects and fragments the precursor ion of each transition and performs a targeted mass analysis for the product ion of the transition. As a result, a chromatogram (the variation of the intensity with retention time) is produced for each transition. Targeted acquisition methods include, but are not limited to, multiple reaction monitoring (MRM) and selected reaction monitoring (SRM).

MRM experiments are typically performed using "low resolution" instruments that include, but are not limited to, triple quadrupole (QqQ) or quadrupole linear ion trap (QqLIT) devices. With the advent of "high resolution" instruments, there was a desire to collect MS and MS/MS using workflows that are similar to QqQ/QqLIT systems. High-resolution instruments include, but are not limited to, quadrupole time-of-flight (QqTOF) or orbitrap devices. These high-resolution instruments also provide new functionality.

MRM on QqQ/QqLIT systems is the standard mass spectrometric technique of choice for targeted quantification in all application areas, due to its ability to provide the highest specificity and sensitivity for the detection of specific components in complex mixtures. However, the speed and sensitivity of today's accurate mass systems have enabled a new quantification strategy with similar performance characteristics. In this strategy (termed MRM high resolution (MRM-HR) or parallel reaction monitoring (PRM)), looped MS/MS spectra are collected at high-resolution with short accumulation times, and then fragment ions (product ions) are extracted post-acquisition to generate MRM-like peaks for integration and quantification. With instrumentation like the TRIPLETOF® Systems of AB SCIEX™, this targeted technique is sensitive and fast enough to enable quantitative performance similar to higher-end triple quadrupole instruments, with full fragmentation data measured at high resolution and high mass accuracy.

In other words, in methods such as MRM-HR, a high-resolution precursor ion mass spectrum is obtained, one or more precursor ions are selected and fragmented, and a high-resolution full product ion spectrum is obtained for each selected precursor ion. A full product ion spectrum is collected for each selected precursor ion but a product ion mass of interest can be specified and everything other than the mass window of the product ion mass of interest can be discarded.

In an IDA (or DDA) method, a user can specify criteria for collecting mass spectra of product ions while a sample is being introduced into the tandem mass spectrometer. For example, in an IDA method a precursor ion or mass spectrometry (MS) survey scan is performed to generate a precursor ion peak list. The user can select criteria to filter the peak list for a subset of the precursor ions on the peak list. The survey scan and peak list are periodically refreshed or updated, and MS/MS is then performed on each precursor ion of the subset of precursor ions. A product ion spectrum is produced for each precursor ion. MS/MS is repeatedly performed on the precursor ions of the subset of precursor ions as the sample is being introduced into the tandem mass spectrometer.

In proteomics and many other applications, however, the complexity and dynamic range of compounds is very large. This poses challenges for traditional targeted and IDA methods, requiring very high-speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a DIA method the actions of the tandem mass spectrometer are not varied among MS/MS scans based on data acquired in a previous precursor or survey scan. Instead, a precursor ion mass range is selected. A precursor ion mass selection window is then stepped across the precursor ion mass range. All precursor ions in the precursor ion mass selection window are fragmented and all of the product ions of all of the precursor ions in the precursor ion mass selection window are mass analyzed.

The precursor ion mass selection window used to scan the mass range can be narrow so that the likelihood of multiple precursors within the window is small. This type of DIA method is called, for example, MS/MS$^{ALL}$. In an MS/MS$^{ALL}$ method, a precursor ion mass selection window of about 1 amu is scanned or stepped across an entire mass range. A product ion spectrum is produced for each 1 amu precursor mass window. The time it takes to analyze or scan the entire mass range once is referred to as one scan cycle. Scanning a narrow precursor ion mass selection window across a wide precursor ion mass range during each cycle, however, can take a long time and is not practical for some instruments and experiments.

As a result, a larger precursor ion mass selection window, or selection window with a greater width, is stepped across the entire precursor mass range. This type of DIA method is called, for example, SWATH acquisition. In a SWATH acquisition, the precursor ion mass selection window stepped across the precursor mass range in each cycle may have a width of 5-25 amu, or even larger. Like the MS/MS$^{ALL}$ method, all of the precursor ions in each precursor ion mass selection window are fragmented, and all of the product ions of all of the precursor ions in each mass selection window are mass analyzed. However, because a wider precursor ion mass selection window is used, the cycle time can be significantly reduced in comparison to the cycle time of the MS/MS$^{ALL}$ method.

U.S. Pat. No. 8,809,770 describes how SWATH acquisition can be used to provide quantitative and qualitative information about the precursor ions of compounds of interest. In particular, the product ions found from fragmenting a precursor ion mass selection window are compared to a database of known product ions of compounds of interest. In addition, ion traces or extracted ion chromatograms (XICs) of the product ions found from fragmenting a precursor ion mass selection window are analyzed to provide quantitative and qualitative information.

However, identifying compounds of interest in a sample analyzed using SWATH acquisition, for example, can be difficult. It can be difficult because either there is no precursor ion information provided with a precursor ion mass selection window to help determine the precursor ion that produces each product ion, or the precursor ion information provided is from a mass spectrometry (MS) observation that has a low sensitivity. In addition, because there is little or no specific precursor ion information provided with a precursor ion mass selection window, it is also difficult to determine if a product ion is convolved with or includes contributions from multiple precursor ions within the precursor ion mass selection window.

As a result, a method of scanning the precursor ion mass selection windows in SWATH acquisition, called scanning SWATH, was developed. Essentially, in scanning SWATH, a precursor ion mass selection window is scanned across a mass range so that successive windows have large areas of overlap and small areas of non-overlap. This scanning makes the resulting product ions a function of the scanned precursor ion mass selection windows. This additional information, in turn, can be used to identify the one or more precursor ions responsible for each product ion.

Scanning SWATH has been described in International Publication No. WO 2013/171459 A2 (hereinafter "the '459 Application"). In the '459 Application, a precursor ion mass selection window or precursor ion mass selection window of 25 Da is scanned with time such that the range of the precursor ion mass selection window changes with time. The timing at which product ions are detected is then correlated to the timing of the precursor ion mass selection window in which their precursor ions were transmitted.

The correlation is done by first plotting the mass-to-charge ratio (m/z) of each product ion detected as a function of the precursor ion m/z values transmitted by the quadrupole mass filter. Since the precursor ion mass selection window is scanned over time, the precursor ion m/z values transmitted by the quadrupole mass filter can also be thought of as times. The start and end times at which a particular product ion is detected are correlated to the start and end times at which its precursor is transmitted from the quadrupole. As a result, the start and end times of the product ion signals are used to determine the start and end times of their corresponding precursor ions.

SUMMARY

A system, method, and computer program product are disclosed for detecting and reducing space charge effects in time-of-flight mass spectrometry (TOF-MS) analysis. The system includes an ion source device, a mass spectrometer, and a processor.

The ion source device continuously receives and ionizes a compound of a sample, producing an ion beam. The mass spectrometer includes at least a mass filter and a TOF mass analyzer. The mass spectrometer receives the ion beam from the ion source device. The mass spectrometer is operated to select a precursor ion mass range of the ion beam using the mass filter and to mass analyze the selected mass range using the mass analyzer, producing a precursor ion mass spectrum for the mass range. The mass spectrometer is operated to maintain a continuous flow of selected precursor ions between the mass filter and the mass analyzer. The mass spectrometer is operated with a first set of parameters to produce precursor ion peaks for the compound with a sensitivity above a first sensitivity threshold and a resolution above a first resolution threshold. In other words, the mass spectrometer is operated with a first set of parameters in a first mode to analyze the compound with a high sensitivity and high resolution.

The processor detects a space charge effect by determining if a TIC received from the mass spectrometer is greater than a TIC threshold or if a precursor ion peak of the mass spectrum received from the mass spectrometer has a resolution that is less than the first resolution threshold.

If a space charge effect is detected, the processor reduces the space charge effect by instructing the mass filter to apply to the ion beam at least one precursor ion transmission window. The at least one precursor ion transmission window has a width smaller than the mass range. The at least one precursor ion transmission window is positioned to include at least one precursor ion of the compound that is multiply charged. The processor further instructs the TOF mass analyzer to mass analyze the precursor ions of the ion beam selected by the at least one precursor ion transmission window, producing a precursor ion mass spectrum for the at least one precursor ion transmission window.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
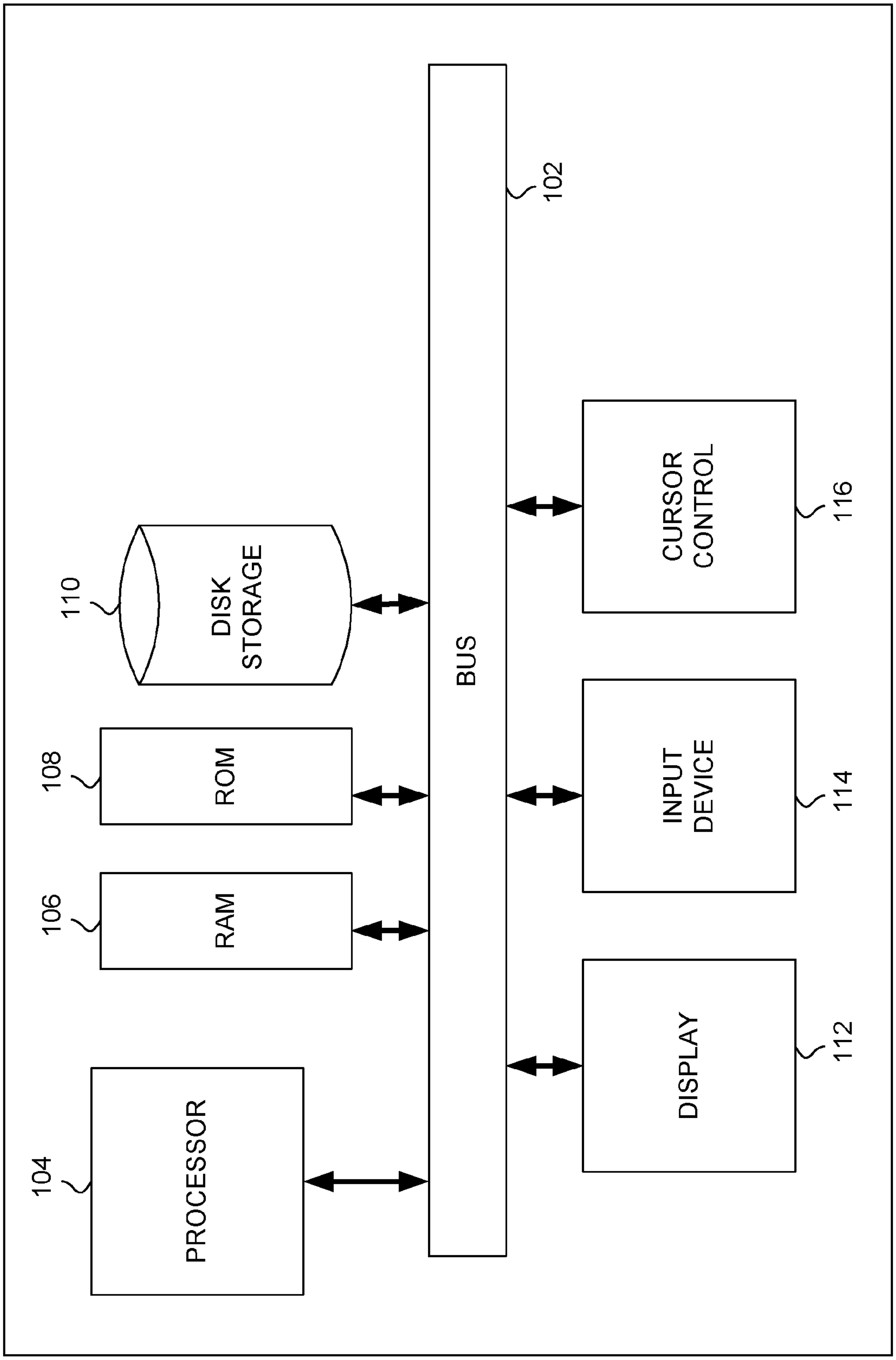
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random-access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

The term "computer-readable medium" or "computer program product" as used herein refers to any media that participates in providing instructions to processor 104 for execution. The terms "computer-readable medium" and "computer program product" are used interchangeably throughout this written description. Such a medium may take many forms, including but not limited to, non-volatile media, volatile media, and precursor ion mass selection media. Non-volatile media includes, for example, optical or magnetic disks, such as storage device 110. Volatile media includes dynamic memory, such as memory 106.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Reducing Space Charge Effects Through Mass Filtering

As described above, recent TOF mass spectrometers can measure ion peaks with greater sensitivity and resolution than previous mass spectrometers. Due to the higher sensitivity and resolution of these new TOF mass spectrometers space charge effects have become more important.

One proposed solution to the space charge problem is to retune the TOF mass analyzer when a space charge effect is detected. Usually, this is achieved by throttling the total ion current (TIC) either by various beam focusing means or by changing the duty cycle of ion introduction. Unfortunately, both changes to the ion beam and changes to the duty cycle can lead to reduced sensitivity and dynamic range.

For example, as described above, a comparison of FIGS. 2 and 3 shows that attenuating the ion beam improved the resolution but at the expense of sensitivity. Consequently, there is a need for additional systems and methods for reducing space charge effects.

In addition, methods for reducing space charge effects are only needed in special instances of particular compounds analyzed by particular instruments. Thus, space charge reduction should be coupled to the detection of space charge effects. As a result, additional systems and methods are needed for detecting and reducing space charge effects without significantly reducing the sensitivity or resolution of a TOF mass spectrometer.

In various embodiments, a space charge effect is detected when the total ion current (TIC) is greater than a predetermined threshold or when a precursor ion peak of a compound of interest has a resolution that is less than a predetermined threshold. In response to the detected space charge effect, in various embodiments, the space charge effect is reduced using mass filtering. Mass filtering reduces the total number of ions that are mass analyzed thereby reducing the total space charge and increasing the resolution.

Unfortunately, mass filtering also reduces the mass range and therefore the sensitivity. However, in mass filtering, the sensitivity for the selected peaks is not compromised. This is advantageous in two ways. First, a mixture of two compounds can have a first compound that is very abundant and not of interest and second compound that is present at trace levels and is of interest. In this case, filtering the ions of no interest (the first compound) can yield better sensitivity than trying to meet space charge requirements for all ions.

Second, not all ion signals from the same compound are of equal value. Specifically, in TOF mass spectrometers lower charge states are generally easier to resolve for large multiply charged compounds. This comes from the fact that the spacing between isotopes in the time domain is larger for lower charge states and onset of peak coalescence happens later. Therefore, it is possible that some of the charge states present in the mass spectrum are of not of good use and still contribute to the space charge problem. Consequently, mass filtering allows the selection of only those charge states that can be well resolved.

More specifically, in various embodiments, a precursor ion transmission window is used to select just a portion of the precursor ions of a mass range and thereby reduce the overall space charge. One precursor ion transmission window can be used, producing one precursor ion mass spectrum, or two or more precursor ion transmission windows can be used over the entire mass range, producing two or more precursor ion mass spectra. Further, one or more precursor ion transmission windows can be used in a targeted manner or a non-targeted manner.

Targeted Approach

For example, in one targeted approach, a lower sensitivity and lower resolution MS survey scan can be used to locate precursor ions across a mass range. This is similar to the MS survey scan for an IDA method, as described above. Unlike an IDA method, however, a single precursor ion transmission window is used to select or filter one or more precursor ions for a high sensitivity and high-resolution MS scan rather than an MS/MS scan.

Returning to FIG. 3, spectrum 310 depicts a lower sensitivity MS scan like an MS survey scan. In the targeted approach, a precursor ion peak, which has an intensity above a predetermined threshold, such as peak 311 can be selected for mass filtering. Just peak 311 can be selected by a single precursor ion transmission window or two or more peaks such as peaks 311, 312, and 313, can be selected by a single precursor ion transmission window.

Figure 2:
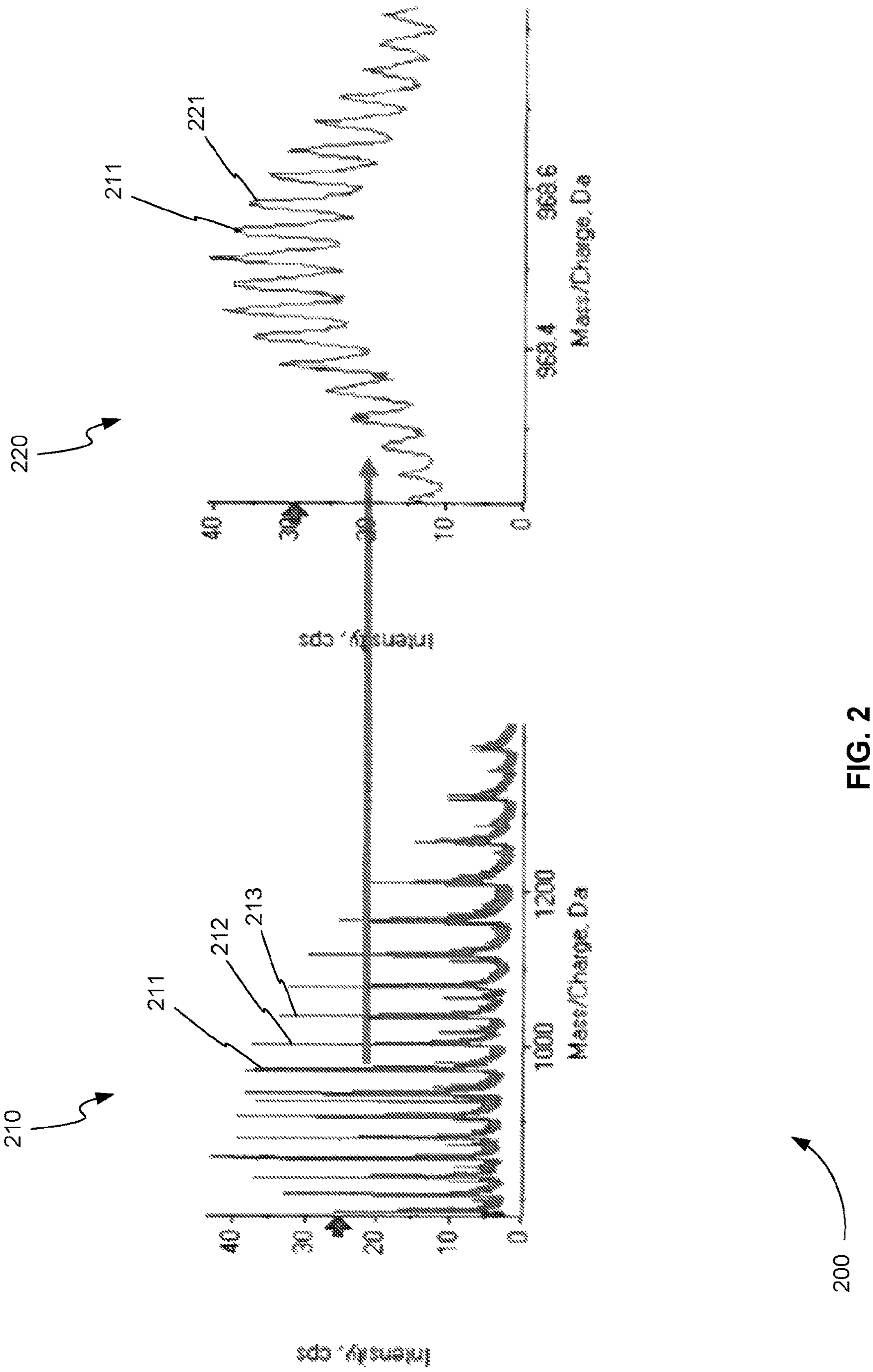
FIG. 2 is an exemplary series of plots showing a precursor ion spectrum that includes large multiply charged ions with a high charge state and a zoomed-in section of the same spectrum showing the isotopes of one particular highly charged ion upon which embodiments of the present invention may be implemented.
Figure 4:
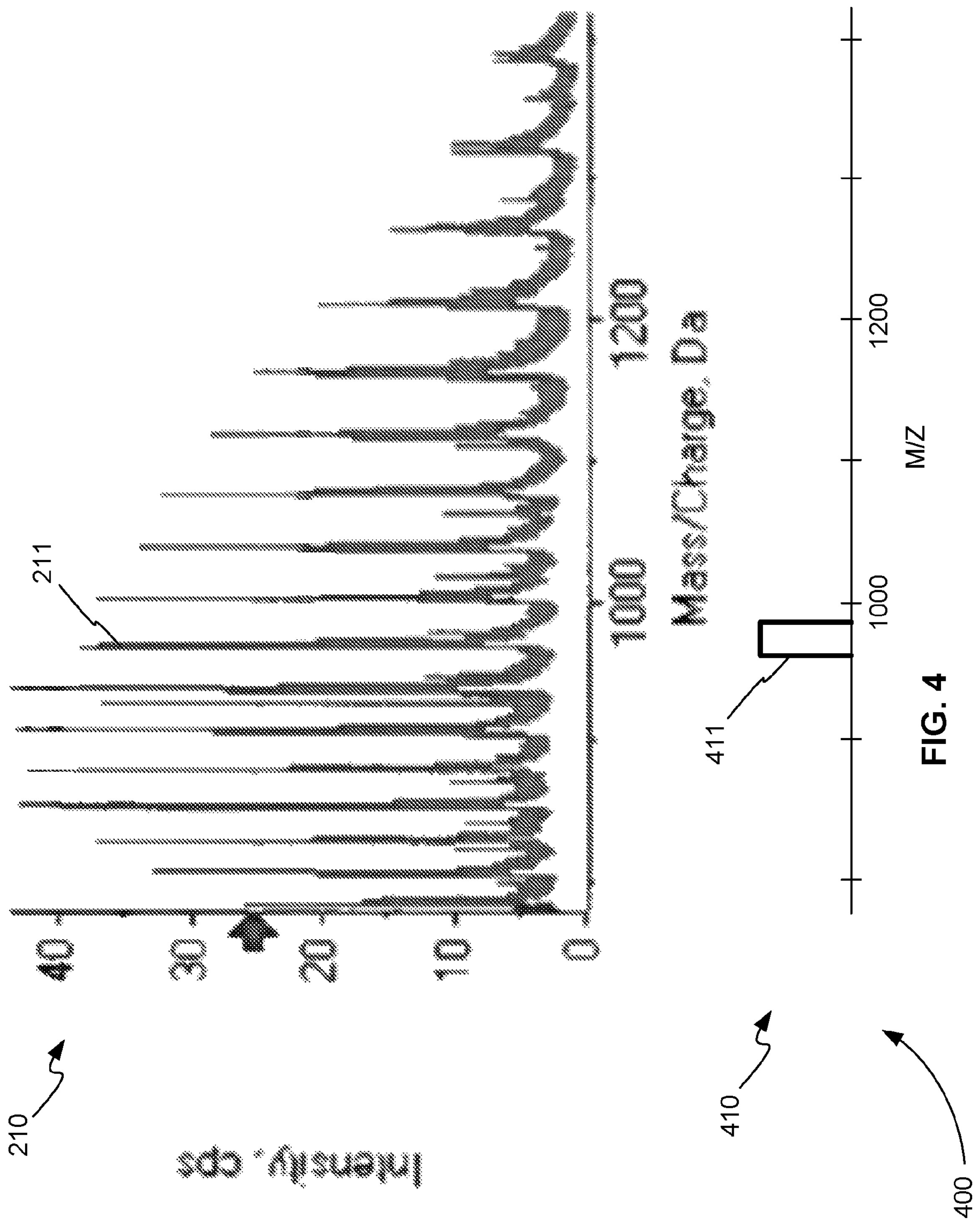
FIG. 4 is an exemplary diagram of the full spectrum of FIG. 2 and a precursor ion transmission window showing how the window is used to select a single precursor ion for MS mass analysis, in accordance with various embodiments.

FIG. 4 is an exemplary diagram 400 of the full spectrum of FIG. 2 and a precursor ion transmission window showing how the window is used to select a single precursor ion for MS mass analysis, in accordance with various embodiments. Spectrum 210 of FIG. 4 shows the precursor ions of carbonic anhydrase II that would be measured with a high sensitivity across the entire mass range. Mass range 410 shows a single precursor ion transmission window 411 that can be applied to select the ion of carbonic anhydrase II represented by peak 211 of spectrum 210.

Figure 5:
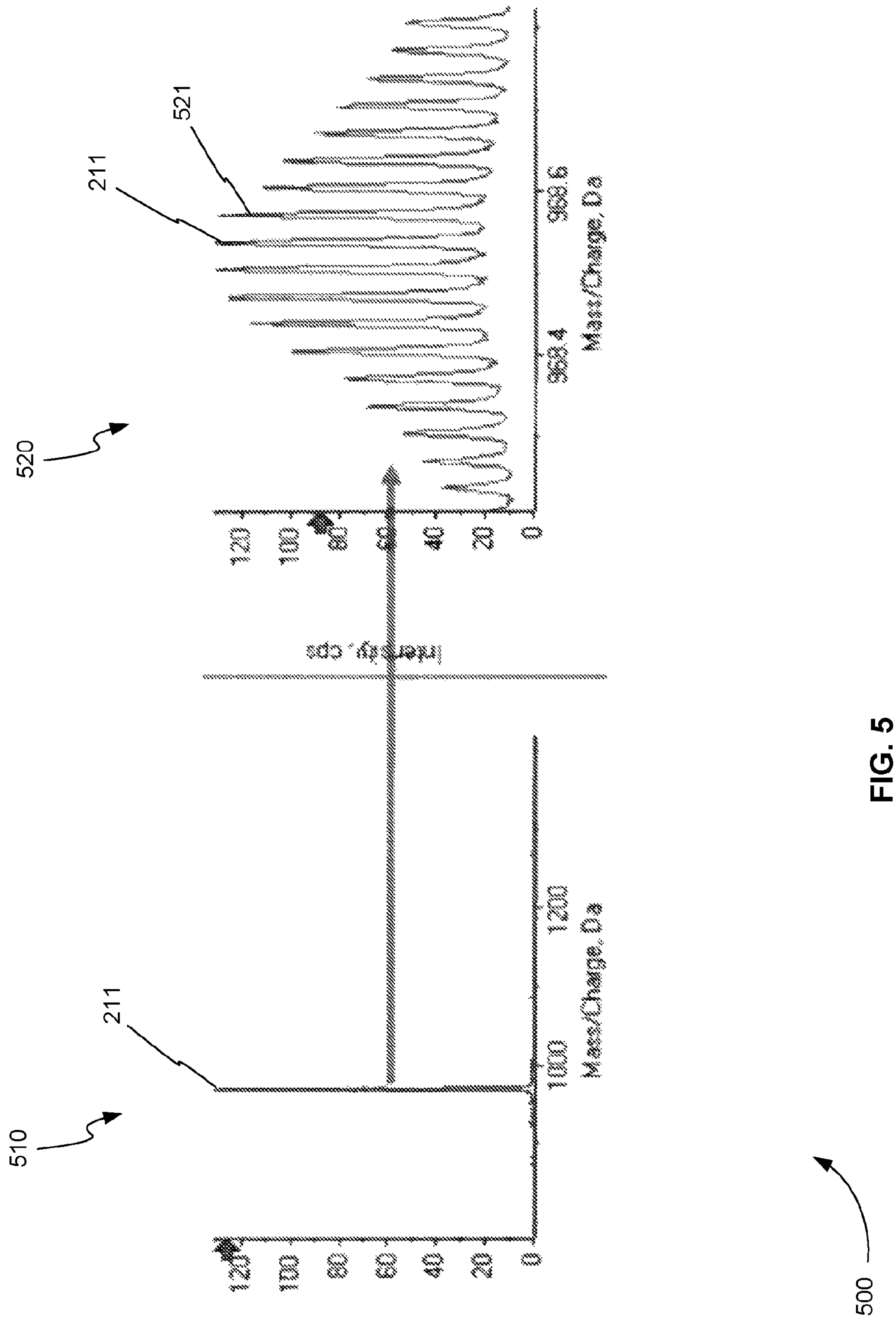
FIG. 5 is an exemplary series of plots showing a precursor ion spectrum and a zoomed-in section of the same spectrum for the same sample protein and using the same mass spectrometer of FIG. 2 but after mass filtering one precursor ion using the single precursor ion transmission window of FIG. 4, in accordance with various embodiments.

FIG. 5 is an exemplary series 500 of plots showing a precursor ion spectrum and a zoomed-in section of the same spectrum for the same sample protein and using the same mass spectrometer of FIG. 2 but after mass filtering one precursor ion using the single precursor ion transmission window of FIG. 4, in accordance with various embodiments. Precursor ion spectrum 510 now includes just one ion of carbonic anhydrase II. Peak 211 has an m/z value of 968.54. Thus, peak 211 represents a precursor ion of carbonic anhydrase II with a charge state of +30. All other precursor ion peaks have been filtered out by the single precursor ion transmission window of FIG. 4.

Zoomed spectrum 520 depicts the zoomed-in region around peak 211 between 968.2 and 968.8 m/z. In this region, the isotopes of the precursor at m/z value of 968.54 can be seen. For example, peak 521 represents an isotope of precursor ion of peak 211.

Figure 3:
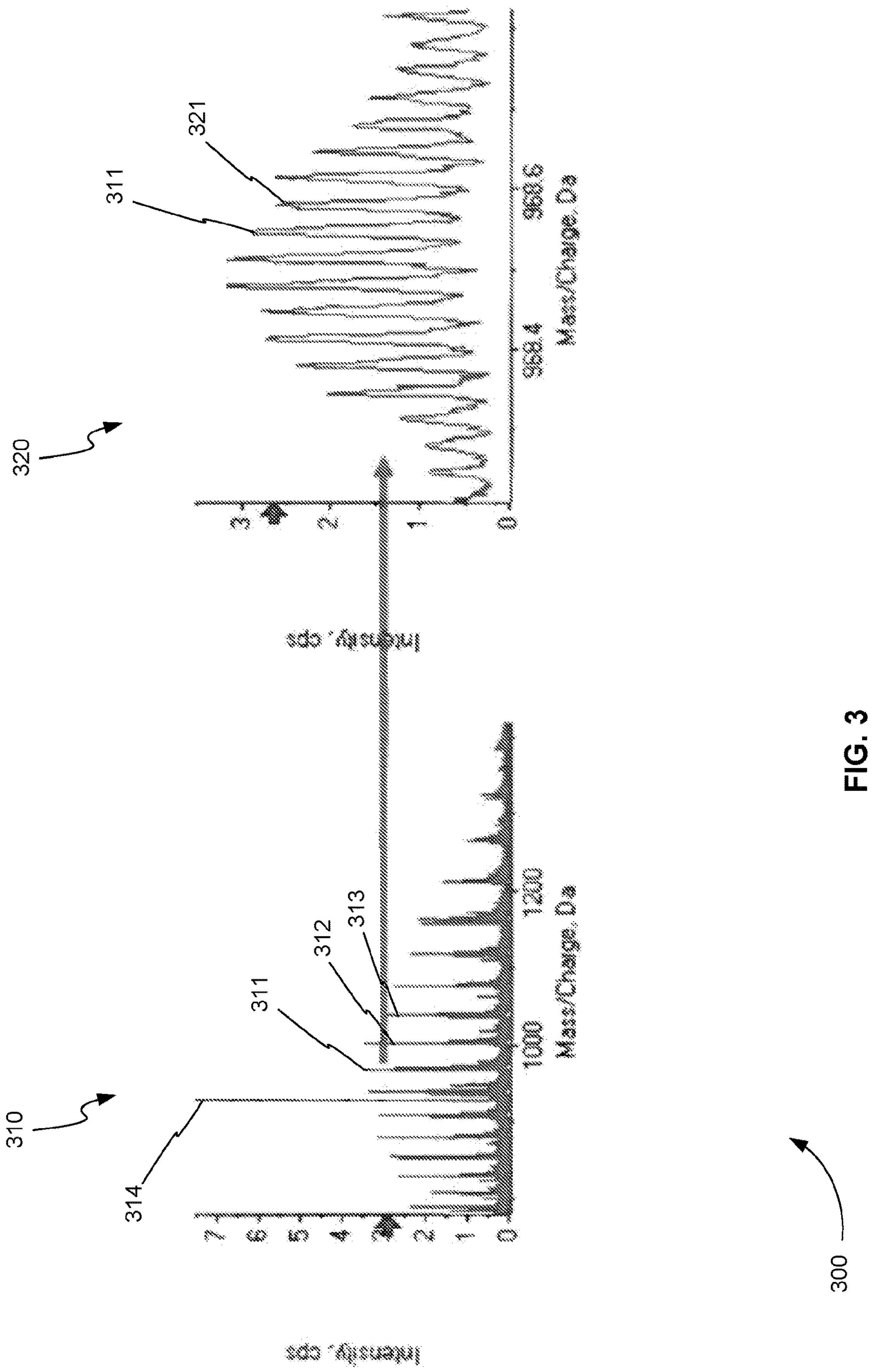
FIG. 3 is an exemplary series of plots showing a precursor ion spectrum and a zoomed-in section of the same spectrum for the same sample protein and using the same mass spectrometer of FIG. 2 but with the ITC parameter of the mass spectrometer reduced to 3% upon which embodiments of the present invention may be implemented.

Due to the mass filtering using the single precursor ion transmission window of FIG. 4, the peaks in zoomed spectrum 520 are improved even over the peaks of zoomed spectrum 320 of FIG. 3. In fact, the resolution of the peaks in spectrum 520 has now improved to 100,000 (FWHM). In other words, using mass filtering produced a reduction of the space charge so that a large multiply charged ion that is highly charged was mass-analyzed with a high resolution.

High sensitivity for the entire mass range, of course, was lost by using such a small precursor ion transmission window or bandpass filter. However, as described above, this sensitivity can be regained by reconstructing other multiply charged ions of the compound of interest from the single ion measured.

Reconstruction, however, is based on knowing that a particular precursor ion is a multiply charged ion. As a result, some type of a priori knowledge or some type of analysis is needed to determine that the precursor ion is multiply charged. A priori knowledge can include input from a user that provides the mass and potential charge state of compounds of interest.

Alternatively, measurements of at least two separate ions can be used to determine if the ions are the same compound with multiple charges. As a result, instead of mass filtering using a precursor ion transmission window that selects only a single ion, a precursor ion transmission window can be used that selects at least two separate ions. Selecting just a few precursor ions of the mass range is unlikely to increase the space charge large enough to again reduce resolution.

Figure 6:
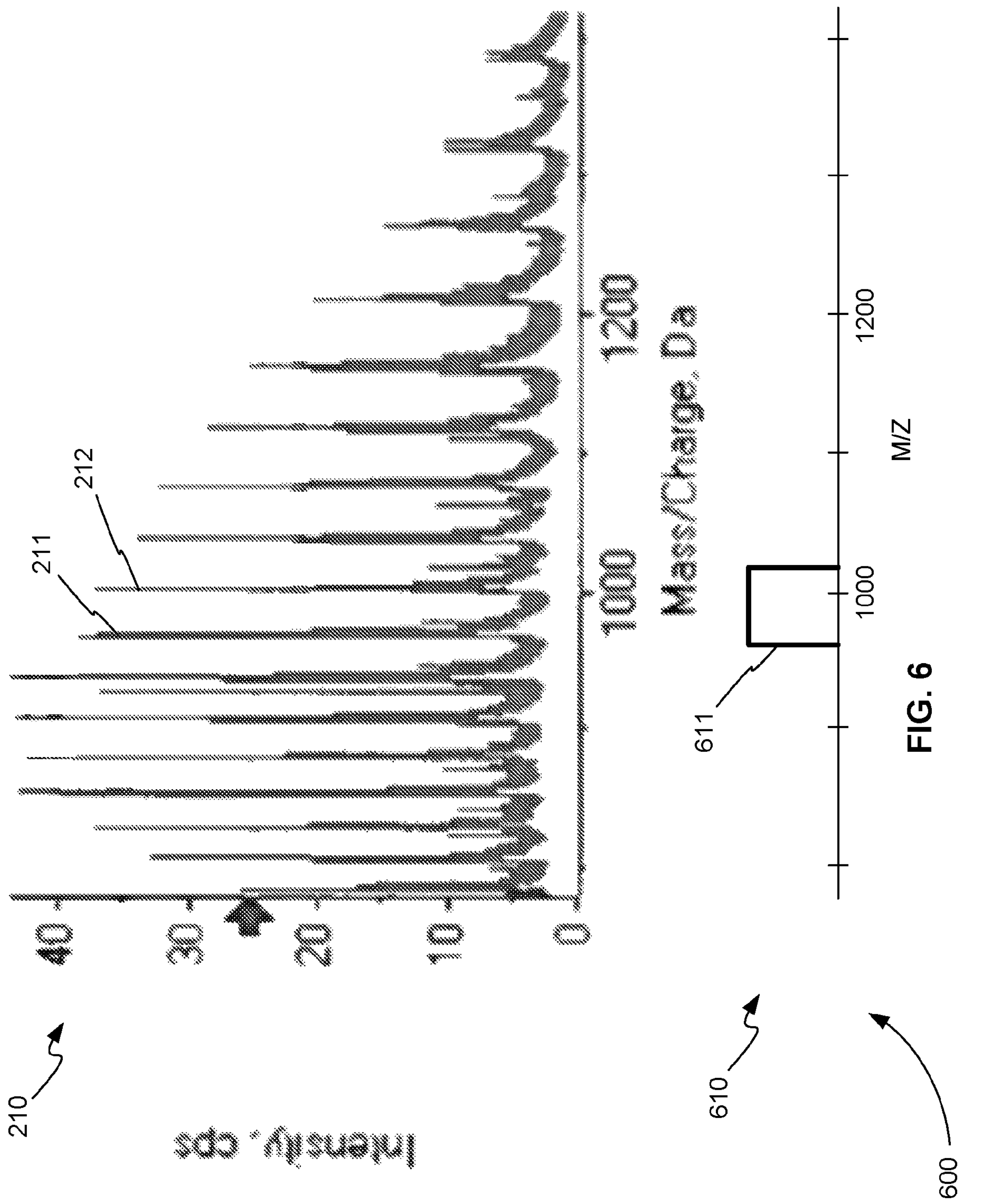
FIG. 6 is an exemplary diagram of the full spectrum of FIG. 2 and a precursor ion transmission window showing how the window is used to select at least two precursor ions for MS mass analysis, in accordance with various embodiments.

FIG. 6 is an exemplary diagram 600 of the full spectrum of FIG. 2 and a precursor ion transmission window showing how the window is used to select at least two precursor ions for MS mass analysis, in accordance with various embodiments. Spectrum 210 of FIG. 6 shows the precursor ions of carbonic anhydrase II that would be measured with a high sensitivity across the entire mass range. Mass range 610 shows a single precursor ion transmission window 611 that can be applied to select two ions of carbonic anhydrase II represented by peak 211 and peak 212 of spectrum 210.

The m/z values of peak 211 and peak 212 are then used, in various embodiments, to verify that that the precursor ions represented by these peaks are multiply charged ions. For example, m/z values of peak 211 and peak 212 are multiplied by various charge values. In this case, multiplying the m/z value of peak 211 by +30 and multiplying the m/z value of peak 212 by +31 would show that both ions have the same mass of carbonic anhydrase II, which is on the order of 29 kDa. Thus, these peaks are verified as peaks of a multiply charged ion.

Non-Targeted Approach

In a non-targeted approach, in various embodiments, multiple precursor ion transmission windows that are each smaller than the mass range are stepped or scanned across the mass range. Using precursor ion transmission windows that are smaller than the mass range reduces space charge and therefore allows high resolution to be maintained. Using multiple precursor ion transmission windows across the mass range allows multiply charged ions to be determined from at least two ion measurements. As a result, sensitivity can be regained by reconstructing all of the multiply charged ions from the measured ions.

Figure 7:
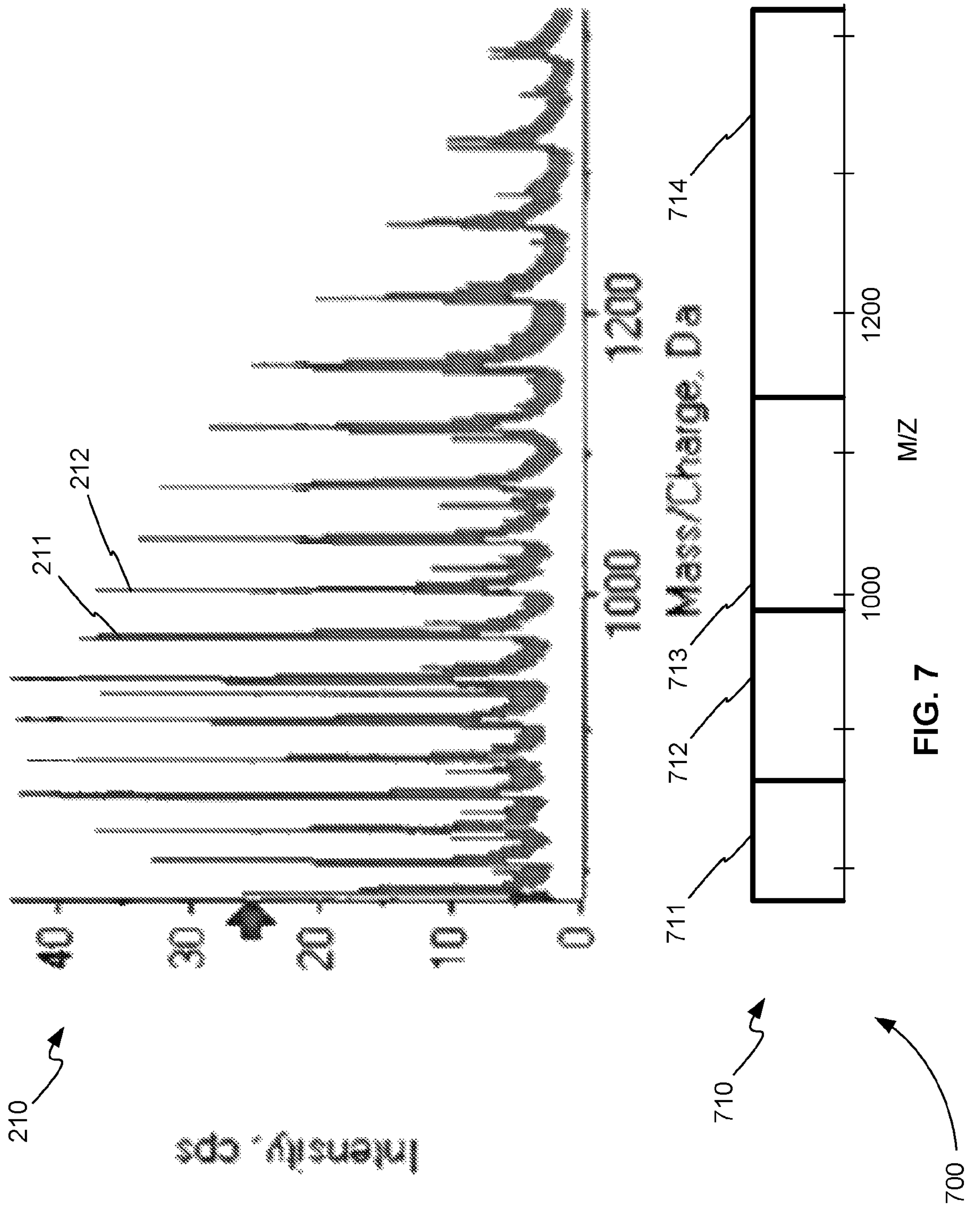
FIG. 7 is an exemplary diagram of the full spectrum of FIG. 2 and a series of precursor ion transmission windows stepped across the mass range showing how the stepped precursor ion transmission windows are used to select all the precursor ions of the mass range for MS mass analysis, in accordance with various embodiments.

FIG. 7 is an exemplary diagram 700 of the full spectrum of FIG. 2 and a series of precursor ion transmission windows stepped across the mass range showing how the stepped precursor ion transmission windows are used to select all the precursor ions of the mass range for MS mass analysis, in accordance with various embodiments. Spectrum 210 of FIG. 7 shows the precursor ions of carbonic anhydrase II that can be measured with a high sensitivity across the entire mass range. Mass range 710 shows how four precursor ion transmission windows 711, 712, 713, and 714 are position across the mass range of spectrum 210 to select in a stepwise fashion all of the ions of carbonic anhydrase II of spectrum 210.

The precursor ion of peak 211, for example, is selected and mass analyzed using precursor ion transmission window 712, and precursor ion of peak 212 is selected and mass analyzed using precursor ion transmission window 713. Limiting the number of ions in each precursor ion transmission window reduces the space charge and allows the resolution to be maintained.

The precursor ion transmission windows, as shown in FIG. 7, can have different or variable widths. In various alternative embodiments, each of the precursor ion transmission windows can have the same width.

Similarly, the precursor ion transmission windows shown in FIG. 7 do not overlap. In various alternative embodiments, adjacent precursor ion transmission windows can be overlapped.

Although using multiple precursor ion transmission windows is described as a non-targeted approach, targeted or predetermined information can be used to determine the position of the precursor ion transmission windows. For example, each of the precursor ion transmission windows shown in FIG. 4 is positioned to include at least four multiply charged ions of the compound of interest. As in the targeted approach and as described above, information about a compound of interest can be obtained from a priori knowledge about the compound or additional and preceding measurements such as an MS survey scan.

Figure 8:
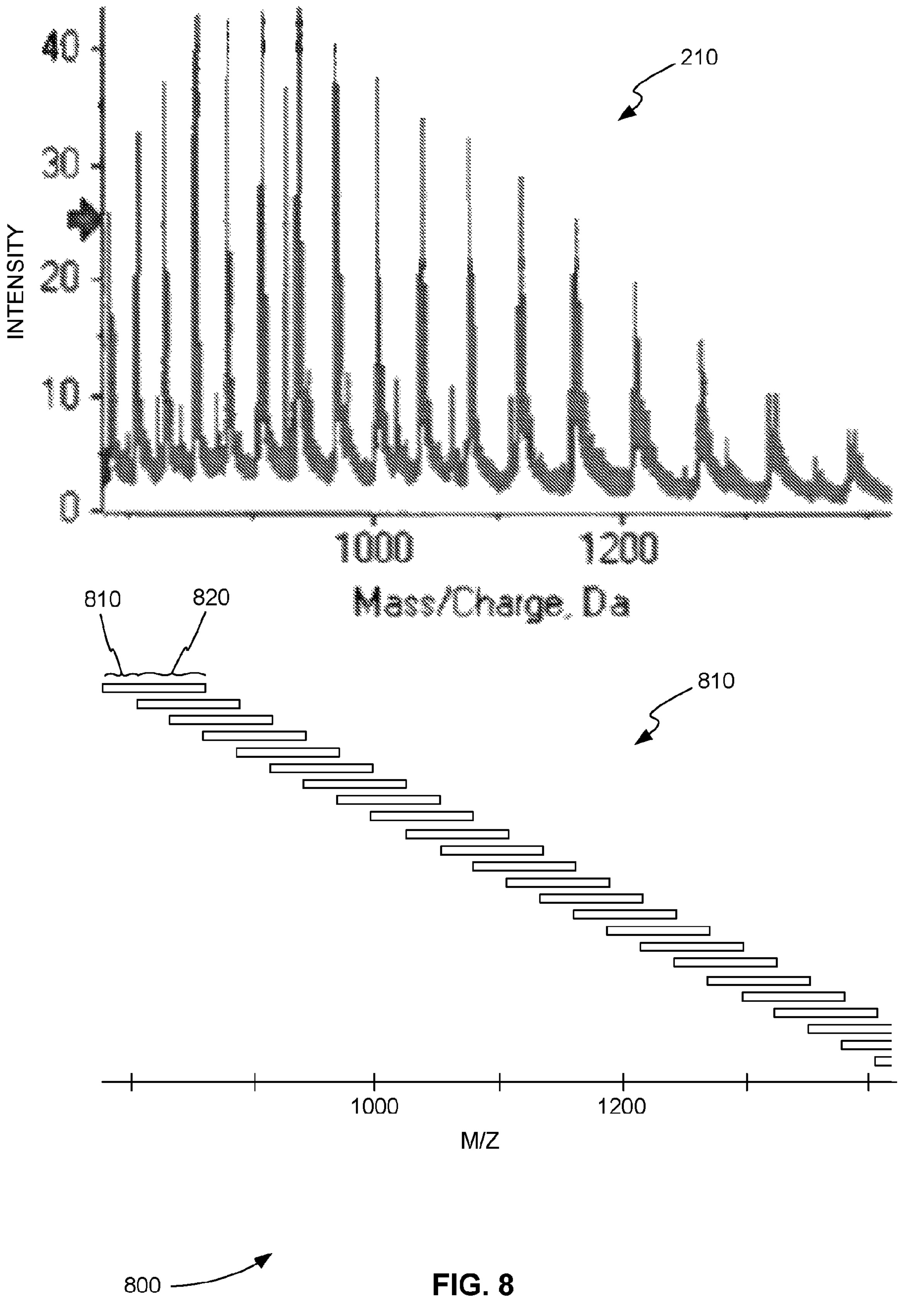
FIG. 8 is an exemplary diagram of the full spectrum of FIG. 2 and a series of precursor ion transmission windows scanned across the mass range showing how the scanned precursor ion transmission windows are used to select all the precursor ions of the mass range for MS mass analysis, in accordance with various embodiments.

FIG. 8 is an exemplary diagram 800 of the full spectrum of FIG. 2 and a series of precursor ion transmission windows scanned across the mass range showing how the scanned precursor ion transmission windows are used to select all the precursor ions of the mass range for MS mass analysis, in accordance with various embodiments. Spectrum 210 of FIG. 8 shows the precursor ions of carbonic anhydrase II that can be measured with a high sensitivity across the entire mass range. Mass range 810 shows how a precursor ion transmission window is scanned across the mass range of spectrum 210 24 times to select all of the ions of carbonic anhydrase II of spectrum 210.

This scanning of precursor ion transmission windows can be thought of as scanning a single precursor ion transmission window 24 times or positioning 24 different precursor ion transmission windows across the mass range. Each precursor ion transmission window has the same width. Each precursor ion transmission window selects the precursor ions within the window and the TOF mass analyzer mass analyzes the precursor ions of each window, producing a precursor ion mass spectrum for each precursor ion transmission window.

As described above, in scanning SWATH, the precursor ions of each precursor ion transmission window are fragmented. In various embodiments, however, the precursor ions of the scanned precursor ion transmission windows described herein are not fragmented. Instead, these precursor ions are simply mass analyzed using the TOF mass analyzer.

Precursor ion transmission windows are scanned so that each following window is offset from a preceding window across the mass range by the same offset amount 810. Each following window overlaps a preceding window by the same overlap amount 820. The offset amount 810 is smaller than the overlap amount 820.

The non-targeted approach provides at least two additional benefits. First, it allows the reconstruction of multiply charged ions that may be found in low abundance. In other words, the survey scan of the targeted approach may not detect ions that have a lower abundance compared to other ions in the spectrum. Secondly, the nontargeted approach allows the sample data to be interrogated after acquisition for additional compounds of interest without having to reanalyze the sample.

The non-targeted approach uses multiple precursor ion selection windows like the DIA methods described above. However, the nontargeted approach described herein differs significantly from previous DIA methods in that an MS scan is performed for each window rather than an MS/MS scan. U.S. Pat. No. 11,069,517 (hereinafter "the '517 Patent") describes using scanning precursor ion selection windows in an MS scan of a targeted IDA method. However, the '517 Patent is directed to filtering out contaminants, such as adducts or product ions of precursor ions that are produced by some form of unintentional spontaneous fragmentation within the mass spectrometer, before fragmentation. The '517 Patent is not directed to the space charge problem in MS analysis. In addition, no charge space problem was previously encountered with TOF mass spectrometers that provided lower sensitivity and resolution. In other words, both the targeted and nontargeted approaches described herein were not thought to be necessary or useful until the space charge problem was encountered with recent high sensitivity and high-resolution TOF mass spectrometers.

Previously, mass filtering has been used in trapping mass spectrometers to reduce space charge during the MS/MS analysis of fragment or product ions. Excess space charge is a common problem in ion traps. For example, enhanced resolution (ER) MS/MS scans have been available for mass spectrometers that include ion traps for some time. In addition, U.S. Pat. No. 9,318,310 describes a method for operating a mass spectrometer to mass filter fragment or product ions in an ion trap to reduce space charge in the trap.

As described above, however, space charge is also becoming a problem involving recent TOF mass spectrometer systems without a pre-trap. These non-trapping TOF mass spectrometer systems or TOF systems that are not multi-reflecting are typically continuous ion flow systems where there is a continuous flow of ions between a mass filter and the TOF mass analyzer. Using mass filtering to reduce space charge in a continuous flow system where there is a continuous flow of ions between a mass filter and the TOF mass analyzer has not previously been contemplated and would not have been for at least the reasons described above.

System for Detecting and Reducing Space Charge Effects

Figure 9:
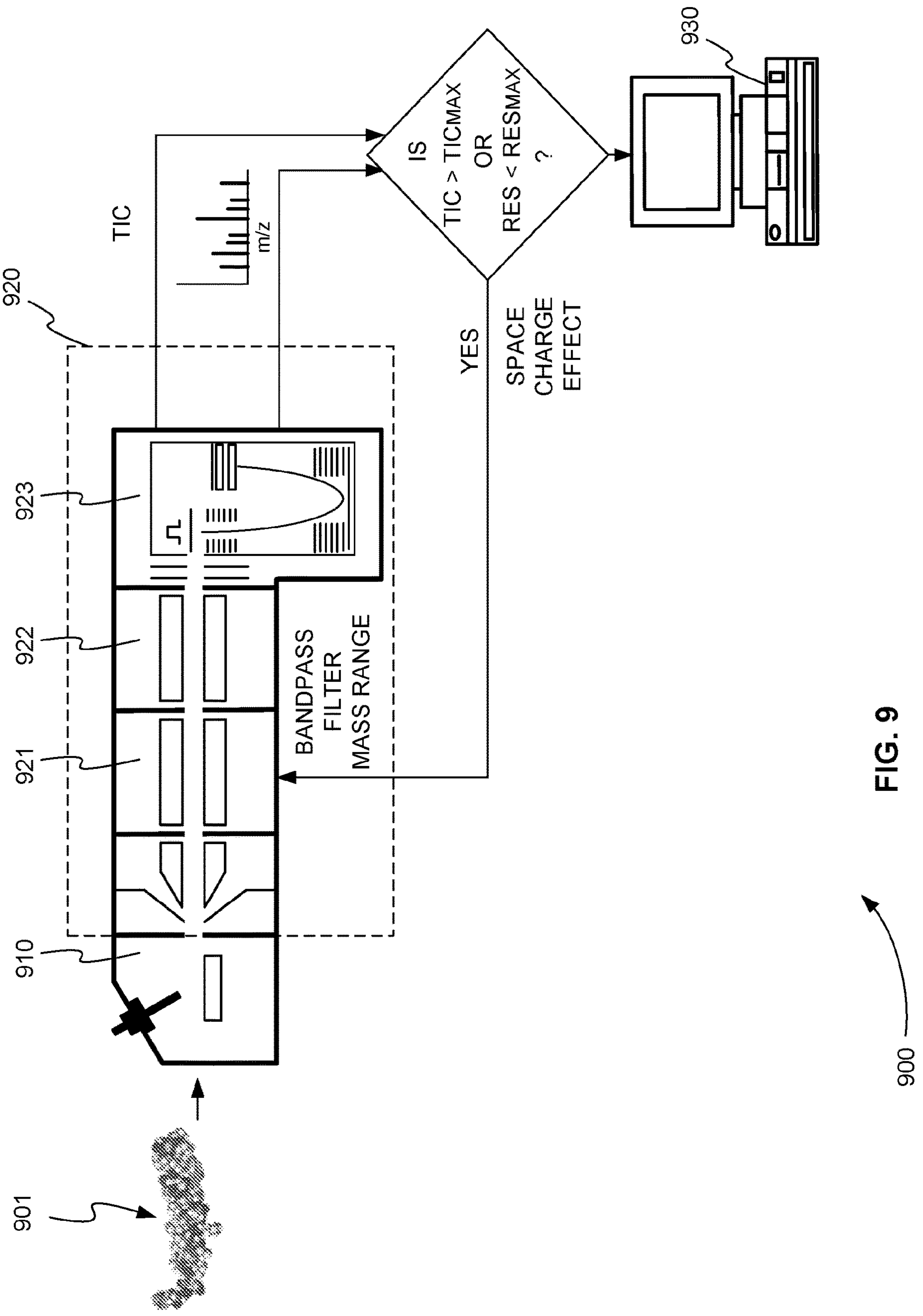
FIG. 9 is a schematic diagram showing a system for detecting and reducing space charge effects in time-of-flight mass spectrometry (TOF-MS) analysis, in accordance with various embodiments.

FIG. 9 is a schematic diagram 900 showing a system for detecting and reducing space charge effects in time-of-flight mass spectrometry (TOF-MS) analysis, in accordance with various embodiments. The system of FIG. 9 includes ion source device 910, time-of-flight (TOF) mass spectrometer 920, and processor 930.

Ion source device 910 continuously receives and ionizes a compound 901 of a sample, producing an ion beam. Ion source device 910 can include any type of source compatible with the purposes described herein, including for example sources that provide ions through electrospray ionization (ESI), matrix-assisted laser desorption ionization (MALDI), ion bombardment, application of electrostatic fields (e.g., field ionization and field desorption), chemical ionization, etc. Ion source device 910 is shown as being a device separate from mass spectrometer 920. However, in various embodiments, ion source device 910 can be part of mass spectrometer 920.

Mass spectrometer 920 includes at least mass filter 921 and TOF mass analyzer 923. Mass filter 921 is shown as a quadruple ion guide in FIG. 9. Mass filter 921, however, can be any type of device used to filter or select precursor ions in a mass spectrometer. Mass spectrometer 920 can also include other devices between mass filter 921 and TOF mass analyzer 923, such as collision cell 922. However, as described herein any devices between mass filter 921 and TOF mass analyzer 923 are used to maintain a continuous flow of precursor ions between mass filter 921 and TOF mass analyzer and are not used to fragment precursor ions.

Mass spectrometer 920 receives the ion beam from ion source device 910. Mass spectrometer 920 is operated to select a precursor ion mass range of the ion beam using mass filter 921 and to mass analyze the selected mass range using mass analyzer 923, producing a precursor ion mass spectrum for the mass range. Mass spectrometer 920 is operated to maintain a continuous flow of selected precursor ions between mass filter 921 and mass analyzer 923. Mass spectrometer 920 is operated with a first set of parameters to produce precursor ion peaks for the compound with a sensitivity above a first sensitivity threshold and a resolution above a first resolution threshold. In other words, mass spectrometer 920 is operated with a first set of parameters in a first mode to analyze the compound with a high sensitivity and high resolution.

Processor 930 can be, but is not limited to, a computer, a microprocessor, the computer system of FIG. 1, or any device capable of sending and receiving control signals and data from mass spectrometer 920 and processing data. Processor 930 is in communication with ion source device 910 and at least mass filter 921 and TOF mass analyzer 923 of mass spectrometer 920.

Processor 930 detects a space charge effect by determining if a TIC received from mass spectrometer 920 is greater than a TIC threshold or if a precursor ion peak of the mass spectrum received from mass spectrometer 920 has a resolution that is less than the first resolution threshold. If a space charge effect is detected, processor 930 reduces the space charge effect by instructing mass filter 921 to apply to the ion beam at least one precursor ion transmission window. The at least one precursor ion transmission window has a width smaller than the mass range. The at least one precursor ion transmission window is positioned to include at least one precursor ion of the compound that is multiply charged. Processor 930 further instructs TOF mass analyzer 923 to mass analyze the precursor ions of the ion beam selected by the at least one precursor ion transmission window, producing a precursor ion mass spectrum for the at least one precursor ion transmission window.

In various embodiments, the least one precursor ion transmission window is positioned to only include the at least one precursor ion of the compound that is multiply charged as shown in FIG. 4. In various alternative embodiments, the least one precursor ion transmission window is positioned to further include one or more additional precursor ions of the sample that are multiply charged as shown in FIG. 6.

In various embodiments, if a space charge effect is detected, processor 930 further instructs mass filter 921 to apply to the ion beam one or more additional precursor ion transmission windows that along with the at least one precursor ion transmission window are positioned to span the entire mass range. Each window of the one or more additional precursor ion transmission windows also has a width smaller than the mass range. Processor 930 further instructs TOF mass analyzer 923 to mass analyze the precursor ions of the ion beam selected by each window of the one or more additional precursor ion transmission windows, producing a precursor ion mass spectrum for each window. The at least one precursor ion transmission window and the one or more additional precursor ion transmission windows make up a plurality of precursor ion transmission windows.

In various embodiments, processor 930 positions the plurality of precursor ion transmission windows in a stepwise fashion across the mass range as shown in FIG. 7. In various embodiments, at least two windows of the plurality of precursor ion transmission windows overlap.

In various embodiments, at least two windows of the plurality of precursor ion transmission windows have different widths. In various alternative embodiments, all of the windows of the plurality of precursor ion transmission windows have the same width.

In various embodiments, all of the windows of the plurality of precursor ion transmission windows have the same width. Processor 930 positions the plurality of precursor ion transmission windows in a scanning fashion across the mass range so that each following window is offset from a preceding window across the mass range by the same offset amount. Each following window overlaps a preceding window by the same overlap amount. The offset amount is smaller than the overlap amount.

In various embodiments, if a space charge effect is detected, processor 930 further, before instructing mass filter 921 to apply the at least one precursor ion transmission window to the ion beam and instructing TOF mass analyzer 923 to mass analyze the precursor ions of the ion beam selected by the at least one precursor ion transmission window, instructs mass spectrometer 920 to use a second set of parameters for an MS survey scan of the mass range.

The second set of parameters produces precursor ion peaks with a sensitivity above a second sensitivity threshold and a resolution above a second resolution threshold. The second sensitivity threshold is less than the first sensitivity threshold and the second resolution threshold is less than the first resolution threshold. After the MS survey scan, processor 930 instructs mass filter 921 to again select the mass range of the ion beam and TOF mass analyzer 923 again to mass analyze the selected mass range, producing a precursor ion survey mass spectrum for the mass range.

In various embodiments, processor 930 instructs mass spectrometer 920 to use a first set of parameters again after the MS survey scan.

In various embodiments, processor 930 further selects the at least one precursor ion of the compound that is multiply charged from the precursor ion survey mass spectrum.

In various embodiments, processor 930 determines that the at least one precursor ion is multiply charged by comparing the m/z value of the at least one precursor ion to the m/z value of one or more other precursor ions of the precursor ion survey mass spectrum and determining that the m/z value of at least one precursor ion of the one or more other precursor and the m/z value of the at least one precursor ion are multiples of the same mass.

Method for Detecting and Reducing Space Charge Effects

Figure 10:
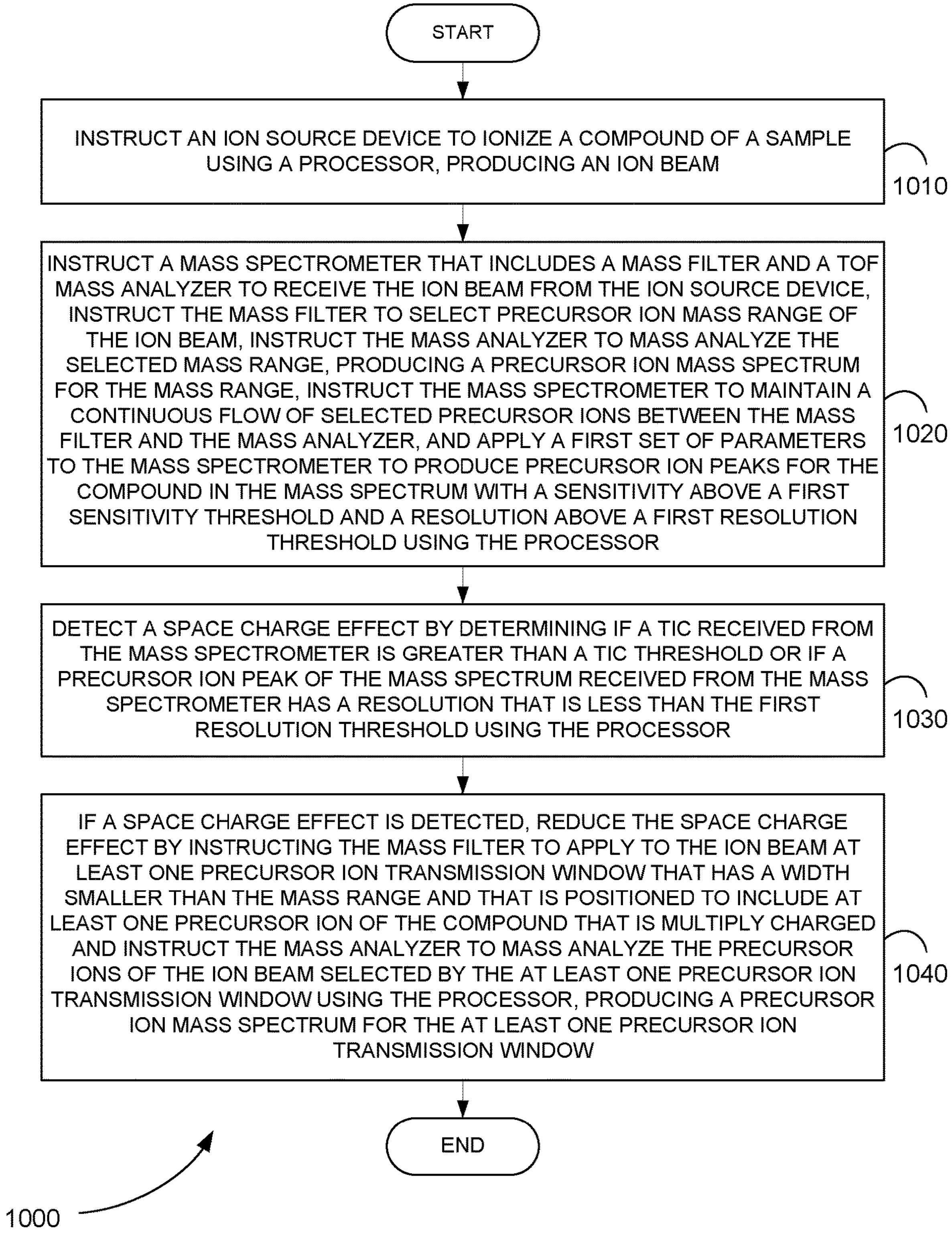
FIG. 10 is a flowchart showing a method for detecting and reducing space charge effects in TOF-MS analysis, in accordance with various embodiments.

FIG. 10 is a flowchart showing a method 1000 for detecting and reducing space charge effects in TOF-MS analysis, in accordance with various embodiments.

In step 1010 of method 1000, an ion source device is instructed to ionize a compound of a sample using a processor, producing an ion beam.

In step 1020, a mass spectrometer that includes a mass filter and a TOF mass analyzer is instructed to receive the ion beam from the ion source device using the processor. The mass filter is instructed to select precursor ion mass range of the ion beam using the processor. The mass analyzer is instructed to mass analyze the selected mass range using the processor, producing a precursor ion mass spectrum for the mass range. The mass spectrometer is instructed to maintain a continuous flow of selected precursor ions between the mass filter and the mass analyzer using the processor. Finally, a first set of parameters is applied to the mass spectrometer to produce precursor ion peaks for the compound in the mass spectrum with a sensitivity above a first sensitivity threshold and a resolution above a first resolution threshold using the processor.

In step 1030, a space charge effect is detected by determining if a TIC received from the mass spectrometer is greater than a TIC threshold or if a precursor ion peak of the mass spectrum received from the mass spectrometer has a resolution that is less than the first resolution threshold using the processor.

In step 1040, if a space charge effect is detected, the space charge effect is reduced by instructing the mass filter to apply to the ion beam at least one precursor ion transmission window that has a width smaller than the mass range and that is positioned to include at least one precursor ion of the compound that is multiply charged using the processor. In addition, the mass analyzer is instructed to mass analyze the precursor ions of the ion beam selected by the at least one precursor ion transmission window using the processor, producing a precursor ion mass spectrum for the at least one precursor ion transmission window.

Computer Program Product for Detecting and Reducing Space Charge Effects

In various embodiments, a computer program product includes a non-transitory tangible computer-readable storage medium whose contents include a program with instructions being executed on a processor so as to perform a method for detecting and reducing space charge effects in TOF-MS analysis. This method is performed by a system that includes one or more distinct software modules.

Figure 11:
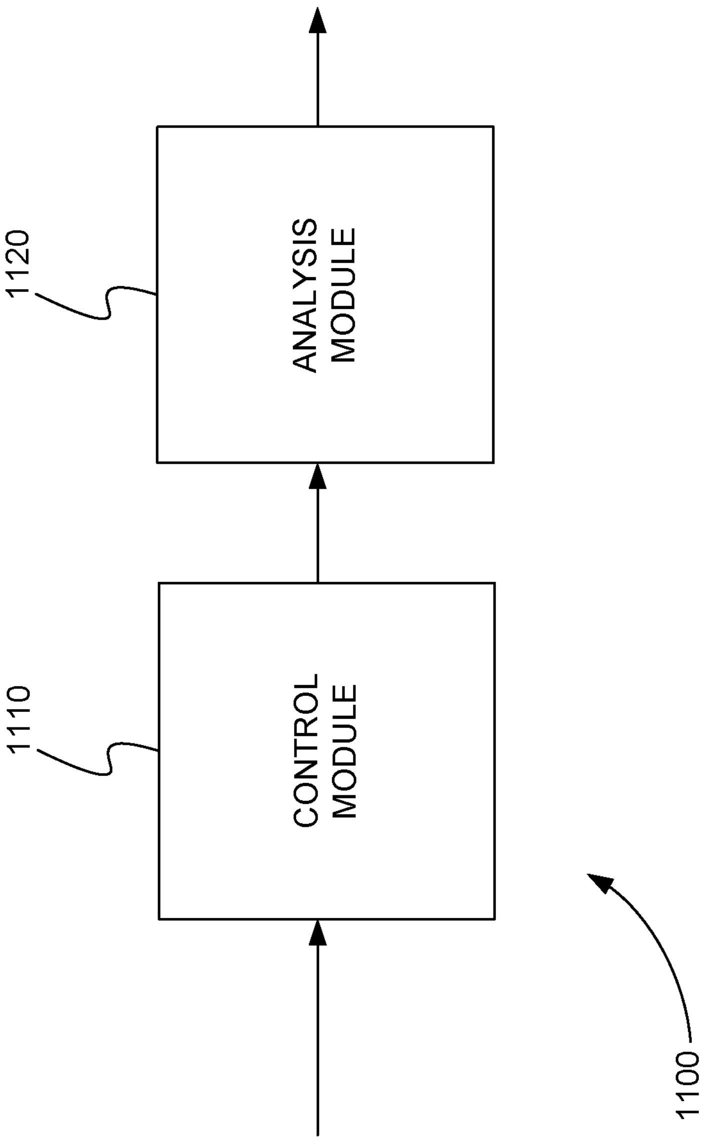
FIG. 11 is a schematic diagram of a system that includes one or more distinct software modules that performs a method for detecting and reducing space charge effects in TOF-MS analysis.

FIG. 11 is a schematic diagram of a system 1100 that includes one or more distinct software modules that performs a method for detecting and reducing space charge effects in TOF-MS analysis. System 1100 includes control module 1110 and analysis module 1120.

Control module 1110 instructs an ion source device to ionize a compound of a sample, producing an ion beam.

Control module 1110 instructs a mass spectrometer that includes a mass filter and a TOF mass analyzer to receive the ion beam from the ion source device. Control module 1110 instructs the mass filter to select precursor ion mass range of the ion beam. Control module 1110 instructs the mass analyzer to mass analyze the selected mass range, producing a precursor ion mass spectrum for the mass range. Control module 1110 instructs the mass spectrometer to maintain a continuous flow of selected precursor ions between the mass filter and the mass analyzer. Finally, control module 1110 applies a first set of parameters to the mass spectrometer to produce precursor ion peaks for the compound in the mass spectrum with a sensitivity above a first sensitivity threshold and a resolution above a first resolution threshold.

Analysis module 1120 detects a space charge effect by determining if a TIC received from the mass spectrometer is greater than a TIC threshold or if a precursor ion peak of the mass spectrum received from the mass spectrometer has a resolution that is less than the first resolution threshold.

If a space charge effect is detected, control module 1110 reduces the space charge effect by instructing the mass filter to apply to the ion beam at least one precursor ion transmission window that has a width smaller than the mass range and that is positioned to include at least one precursor ion of the compound that is multiply charged. In addition, control module 1110 instructs the mass analyzer to mass analyze the precursor ions of the ion beam selected by the at least one precursor ion transmission window, producing a precursor ion mass spectrum for the at least one precursor ion transmission window.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for detecting and reducing space charge effects in time-of-flight (TOF) mass spectrometry (MS) analysis, comprising:

an ion source device that ionizes a compound of a sample, producing an ion beam;

a mass spectrometer that includes a mass filter and a TOF mass analyzer, receives the ion beam from the ion source device, is operated to select a precursor ion mass range of the ion beam using the mass filter and to mass analyze the selected mass range using the mass analyzer, producing a precursor ion mass spectrum for the mass range, is operated to maintain a continuous flow of selected precursor ions between the mass filter and the mass analyzer, and is operated with a first set of parameters to produce precursor ion peaks for the compound in the mass spectrum with a sensitivity above a first sensitivity threshold and a resolution above a first resolution threshold; and a processor that detects a space charge effect by determining if a total ion current (TIC) received from the mass spectrometer is greater than a TIC threshold or if a precursor ion peak of the mass spectrum received from the mass spectrometer has a resolution that is less than the first resolution threshold, and if a space charge effect is detected, reduces the space charge effect by instructing the mass filter to apply to the ion beam at least one precursor ion transmission window that has a width smaller than the mass range and that is positioned to include at least one precursor ion of the compound that is multiply charged and instructing the mass analyzer to mass analyze the precursor ions of the ion beam selected by the at least one precursor ion transmission window, producing a precursor ion mass spectrum for the at least one precursor ion transmission window.

2. The system of claim 1, wherein the least one precursor ion transmission window is positioned to only include the at least one precursor ion of the compound that is multiply charged.

3. The system of claim 1, wherein the least one precursor ion transmission window is positioned to further include one or more additional precursor ions of the sample that are multiply charged.

4. The system of claim 1, wherein if a space charge effect is detected, the processor further instructs the mass filter to apply to the ion beam one or more additional precursor ion transmission windows that along with the at least one precursor ion transmission window are positioned to span the entire mass range, wherein each window of the one or more additional precursor ion transmission windows also has a width smaller than the mass range, wherein the processor further instructs the mass analyzer to mass analyze the precursor ions of the ion beam selected by each window of the one or more additional precursor ion transmission windows, producing a precursor ion mass spectrum for each window, and wherein the at least one precursor ion transmission window and the one or more additional precursor ion transmission windows comprise a plurality of precursor ion transmission windows.

5. The system of claim 4, wherein the processor positions the plurality of precursor ion transmission windows in a stepwise fashion across the mass range.

6. The system of claim 5, wherein at least two windows of the plurality of precursor ion transmission windows overlap.

7. The system of claim 5, wherein at least two windows of the plurality of precursor ion transmission windows have different widths.

8. The system of claim 5, wherein all of the windows of the plurality of precursor ion transmission windows have the same width.

9. The system of claim 4, wherein all of the windows of the plurality of precursor ion transmission windows have the same width and wherein the processor positions the plurality of precursor ion transmission windows in a scanning fashion across the mass range so that each following window is offset from a preceding window across the mass range by the same offset amount, each following window overlaps a preceding window by the same overlap amount, and the offset amount is smaller than the overlap amount.

10. The system of claims 1, wherein if a space charge effect is detected, the processor further, before instructing the mass filter to apply the at least one precursor ion transmission window to the ion beam and instructing the mass analyzer to mass analyze the precursor ions of the ion beam selected by the at least one precursor ion transmission window, instructs the mass spectrometer to use a second set of parameters for a mass spectrometry (MS) survey scan of the mass range that produces precursor ion peaks with a sensitivity above a second sensitivity threshold and a resolution above a second resolution threshold, wherein the second sensitivity threshold is less than the first sensitivity threshold and the second resolution threshold is less than the first resolution threshold, and instructs the mass filter to again select the mass range of the ion beam and the mass analyzer again to mass analyze the selected mass range, producing a precursor ion survey mass spectrum for the mass range.

11. The system of claim 10, wherein the processor instructs the mass spectrometer to use a first set of parameters again after the MS survey scan.

12. The system of claim 10, wherein the processor further selects the at least one precursor ion of the compound that is multiply charged from the precursor ion survey mass spectrum.

13. The system of claim 12, wherein the processor determines that the at least one precursor ion is multiply charged by comparing the mass-to-charge ratio (m/z) value of the at least one precursor ion to the m/z value of one or more other precursor ions of the precursor ion survey mass spectrum and determining that the m/z value of at least one precursor ion of the one or more other precursor and the m/z value of the at least one precursor ion are multiples of the same mass.

14. A method for detecting and reducing space charge effects in time-of-flight (TOF) mass spectrometry (MS) analysis, comprising:

ionizing a compound in an ion source producing an ion beam;

receiving the ion beam from the ion source in a mass spectrometer that includes a mass filter and a TOF mass analyzer, selecting a precursor ion mass range of the ion beam in the mass filter, mass analyzing the selected mass range in the mass analyzer, producing a precursor ion mass spectrum for the mass range, maintaining a continuous flow of selected precursor ions between the mass filter and the mass analyzer in the mass spectrometer, and applying a first set of parameters to the mass spectrometer to produce precursor ion peaks for the compound in the mass spectrum with a sensitivity above a first sensitivity threshold and a resolution above a first resolution threshold;

detecting a space charge effect by determining if a total ion current (TIC) received from the mass spectrometer is greater than a TIC threshold or if a precursor ion peak of the mass spectrum received from the mass spectrometer has a resolution that is less than the first resolution threshold; and if a space charge effect is detected, reducing the space charge effect by having the mass filter apply to the ion beam at least one precursor ion transmission window that has a width smaller than the mass range and that is positioned to include at least one precursor ion of the compound that is multiply charged and mass analyzing in the mass analyzer, the precursor ions of the ion beam selected by the at least one precursor ion transmission window, producing a precursor ion mass spectrum for the at least one precursor ion transmission window.

15. A computer program product, comprising a non-transitory tangible computer-readable storage medium whose contents include a program with instructions that are executable on a processor for detecting and reducing space charge effects in time-of-flight (TOF) mass spectrometry (MS) analysis, wherein the instructions are executable on the processor to:

provide a system, wherein the system comprises one or more distinct software modules, and wherein the distinct software modules comprise a control module and an analysis module;

instruct an ion source device to ionize a compound of a sample using the control module, producing an ion beam;

instruct a mass spectrometer that includes a mass filter and a TOF mass analyzer to receive the ion beam from the ion source device, instruct the mass filter to select a precursor ion mass range of the ion beam, instruct the mass analyzer to mass analyze the selected mass range, produce a precursor ion mass spectrum for the mass range, maintaining a continuous flow of selected precursor ions between the mass filter and the mass analyzer, and apply a first set of parameters to the mass spectrometer to produce precursor ion peaks for the compound in the mass spectrum with a sensitivity above a first sensitivity threshold and a resolution above a first resolution threshold using the control module;

detect a space charge effect by determining if a total ion current (TIC) received from the mass spectrometer is greater than a TIC threshold or if a precursor ion peak of the mass spectrum received from the mass spectrometer has a resolution that is less than the first resolution threshold using the analysis module; and if a space charge effect is detected, reduce the space charge effect by instructing the mass filter to apply to the ion beam at least one precursor ion transmission window that has a width smaller than the mass range and that is positioned to include at least one precursor ion of the compound that is multiply charged and instructing the mass analyzer to mass analyze the precursor ions of the ion beam selected by the at least one precursor ion transmission window using the control module, producing a precursor ion mass spectrum for the at least one precursor ion transmission window.

* * * * *